3,641,096

THERMACTIVATION OF CATALYSTS COMPRISING RHENIUM AND CRYSTALLINE ZEOLITIC MOLECULAR SIEVE PARTICLES DISPERSED IN A GEL MATRIX, AND CATALYSTS SO THERMACTIVATED

Joseph Jaffe, Berkeley, and James R. Kittrell, El Cerrito, Calif., assignors to Chevron Research Company, San Francisco, Calif.

No Drawing. Continuation-in-part of application Ser. No. 753,222, Aug. 16, 1968. This application Sept. 20, 1968, Ser. No. 761,308

Int. Cl. B01j 11/40

U.S. Cl. 252—455 Z          5 Claims

ABSTRACT OF THE DISCLOSURE

Method of activating a catalyst composite comprising a crystalline zeolitic molecular sieve, a gel matrix comprising silica-alumina, and a rhenium or rhenium compound hydrogenating component, said molecular sieve being in particulate form and being dispersed in said gel matrix, which method comprises heating said catalyst composite in an oxygen-containing gas stream at 1200° to 1600° F. for 0.25 to 48 hours, and the catalyst composite so activated.

RELATED APPLICATION

This application is a continuation-in-part of copending Joseph Jaffe and James R. Kittrell patent application Ser. No. 753,222, filed Aug. 16, 1968 and now abandoned, for "Hydrocarbon Conversion Catalyst Comprising a Crystalline Zeolitic Molecular Sieve Component in a Matrix of Other Catalyst Components, and Process Using Said Catalyst."

INTRODUCTION

In the aforesaid copending application there is described novel and unusually effective hydrofining-hydrocracking catalysts. Said catalysts include catalysts comprising a crystalline zeolitic molecular sieve component, a matrix comprising a silica-alumina gel, and a hydrogenating component selected from rhenium and compounds of rhenium. Said catalysts additionally may comprise other hydrogenating components selected from certain metals and compounds of metals of Groups VI and VIII. Said rhenium or rhenium compound hydrogenating component, and said other hydrogenating components when present in certain of said catalysts, may be located entirely in the gel matrix, thereby forming a portion of said matrix. Alternatively, any or all of said hydrogenating components may be located entirely in the molecular sieve component of certain of said catalysts, or may be partly in the molecular sieve component and partly in the gel matrix. It has now been found that rhenium-containing or rhenium-compound-containing catalysts of these general types can be even further improved in various respects by a novel heat treatment procedure, which serves both to activate and stabilize the catalysts. Said heat treatment procedure, hereinafter for convenience called an "activation" or "thermactivation" treatment or procedure, is applied to the total catalyst composite, following dispersion of the crystalline zeolitic molecular sieve component in the gel matrix.

STATEMENT OF INVENTION

In accordance with the present invention, catalysts of the aforesaid types are thermactivated in an oxygen-containing gas stream at temperatures in the range 1200° to 1600° F., preferably 1250° to 1400° F., for 0.25 to 48 hours. The oxygen-containing gas stream, which may be air, preferably is as dry as practicable. The improved results obtainable with the process of the present invention are optimized as the gas stream becomes extremely dry; although for most practical purposes the gas stream need be only as dry as ambient air, greater dryness is preferred. Those skilled in the art will be aware of various methods for drying the gas stream to any desired extent.

Although the process of the present invention is applicable to activation of catalysts of the aforesaid types with a wide range of silica contents, it is especially useful with such catalysts that contain less than 40 weight percent silica in the total catalyst, and less than 35 weight percent silica in the catalyst matrix.

Further in accordance with the present invention, there is provided the method of activating a catalyst composite comprising a matrix comprising a silica-alumina gel, a crystalline zeolitic molecular sieve component dispersed in said gel matrix in particulate form, and a hydrogenating component selected from rhenium and compounds of rhenium, which method comprises heating said catalyst composite in an oxygen-containing gas stream at temperatures in the range 1200° F. to 1600° F. for 0.25 to 48 hours.

Further in accordance with the present invention, there is provided the method of activating a catalyst composite comprising:

(A) A gel matrix comprising:
   (a) at least 15 weight percent silica,
   (b) alumina, in an amount providing an alumina-to-silica weight ratio of 15/85 to 80/20;
(B) A cracking component comprising a crystalline zeolitic molecular sieve, said cracking component being in particulate form and being dispersed through said gel matrix;
(C) A Group VIII metal or metal compound hydrogenating component; and
(D) A rhenium or rhenium compound hydrogenating component;

which method comprises heating said catalyst composite in an oxygen-containing gas stream at temperatures in the range 1200° to 1600° F. for 0.25 to 48 hours.

Said Group VIII hydrogenating component preferably is nickel or cobalt, or the combination thereof, in the form of metal, oxide, sulfide or any combination thereof, in an amount of 1 to 10 weight percent of said matrix, calculated as metal. Said catalyst additionally may comprise a Group VI hydrogenating component, preferably molybdenum or tungsten, or the combination thereof, in the form of metal, oxide, sulfide or any combination thereof, in an amount of 5 to 25 weight percent of said matrix, calculated as metal. Said catalyst additionally may comprise a Group IV component, preferably titanium, zirconium, thorium, hafnium, or any combination thereof, in the form of the metal, oxide, sulfide or any combination thereof, in an amount of 1 to 10 weight percent of said matrix, calculated as metal.

Said crystalline zeolitic molecular sieve, advantageously for the process of the present invention, may be an ultra-stable crystalline zeolitic molecular sieve, that is, one having a sodium content below about 3 weight percent, calculated as $Na_2O$, a unit cell size below about 24.65 angstroms, and a silica/alumina ratio above about 2.15. Said crystalline zeolitic molecular sieve, whether or not in the ultra-stable form, may be substantially free of any catalytic loading metal or metals, that is, it may contain no more than about 0.5 weight percent catalytic metal or metals, based on the sieve. The catalytic metals include rhenium and the Group VI and VIII metals, and exclude sodium. Said crystalline zeolitic molecular sieve may be maintained substantially free of any catalytic loading metal or metals by forming a slurry of precursors of the catalyst matrix, including precursors of the catalytic metal or metals, and combining the molecular sieve with the slurry at a pH above 5.0. Where said crystalline zeolitic molecular sieve contain no more than about 0.5 weight percent catalytic metal or metals, based on the sieve, the excess of catalytic metal or metals over this amount will be located in the gel matrix portion of the catalyst. Said crystalline zeolitic molecular sieve may be present in said catalyst in an amount of 1 to 50 weight percent of said catalyst.

Said catalyst preferably will have an average pore diameter below 100 angstroms and a surface area above 200 square meters per gram.

Further in accordance with the present invention, there is provided the method of activating a catalyst composite comprising:

(A) A gel matrix comprising:
  (a) at least 15 weight percent silica,
  (b) alumina, in an amount providing an alumina-to-silica weight ratio of 15/85 to 80/20,
  (c) nickel or cobalt, or the combination thereof, in the form of metal, oxide, sulfide or any combination thereof, in an amount of 1 to 10 weight percent of said matrix, calculated as metal,
  (d) molybdenum or tungsten, or the combination thereof, in the form of metal, oxide, sulfide or any combination thereof, in an amount of 5 to 22 weight percent of said matrix, calculated as metal;
(B) A crystalline zeolitic molecular sieve, said sieve being in particulate form and being dispersed through said matrix;
(C) Rhenium or a compound of rhenium, in an amount of 0.3 to 1 weight percent, based on said catalyst and calculated as metal;

said catalyst composite being further characterized by an average pore diameter below 100 angstroms and a surface area above 200 square meters per gram; which method comprises heating said catalyst composite in an oxygen-containing gas stream at temperatures in the range 1200° to 1600° F. for 0.25 to 48 hours.

Further in accordance with the present invention, there is provided a catalyst composite as described in connection with the aforesaid heat treating method, having hydrocracking activities and stabilities developed therein by said heat treating method.

EXAMPLES

The following examples are given for the purpose of further illustrating the process and catalyst of the present invention, without limiting the scope thereof.

Example 1

A cogelled catalyst (Catalyst A) of the following composition is prepared:

| Component: | Wt. percent of total catalyst |
|---|---|
| NiO | 8.2 |
| WO₃ | 18.2 |
| TiO₂ | 5.6 |
| Al₂O₃ | 24.0 |
| SiO₂ | 24.0 |
| Crystalline zeolitic molecular sieve, "Y" form, containing rhenium in an amount of 1.0 weight percent | 20.0 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing $AlCl_3$, $TiCl_4$, $NiCl_2$ and acetic acid.

(2) Three alkaline solutions are prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components will occur at a neutral pH of about 7.

(3) The acidic and alkaline solutions are combined, and coprecipitation of all of the metal-containing components of those solutions occurs at a pH of about 7, resulting in a slurry.

(4) Linde "Y" crystalline zeolitic molecular sieve in finely divided form is impregnated with 1.0 weight percent rhenium, using a solution of perrhenic acid, and the finely divided molecular sieve so impregnated is added to the slurry.

(5) The molecular sieve-containing slurry is filtered to produce a molecular sieve-containing hydrogel filter cake, which is washed repeatedly with dilute ammonium acetate solution to remove sodium and chloride ionic impurities from both the hydrogen and the molecular sieve contained therein.

(6) The molecular sieve-containing hydrogel is dried in an air-circulating oven and then is activated in flowing air at 950° F. for 5 hours.

The finished catalyst is characterized by a surface area of about 400 m.²/g., a pore volume of about 0.4 cc./g., an average pore diameter of about 40 angstroms, and a molecular sieve component substantially free of catalytic metals except rhenium; that is, substantially all of the nickel, tungsten and titanium in the catalyst is located in the gel portion of the catalyst rather than in the molecular sieve component thereof.

EXAMPLE 2

A cogelled catalyst (Catalyst B), of exactly the same composition as Catalyst A of Example 1, is prepared. The catalyst is prepared in exactly the same manner as Catalyst A of Example 1 except that upon completion of the activation at 950° F. for 5 hours the catalyst is further activated at 1275° F. for 2 hours.

The finished catalyst is characterized by a surface area of about 350 m.²/g., a pore volume of about 0.4 cc./g., an average pore diameter of about 40 angstroms. The molecular sieve component is substantially free of catalytic metals except rhenium.

EXAMPLE 3

A cogelled catalyst (Catalyst C, a comparison catalyst) is prepared. The composition is similar to that of Catalyst A of Example 1 except that it contains only 10 weight percent of crystalline zeolitic molecular sieve and the weight percentages of the other components are proportionally adjusted. Catalyst C is prepared in exactly the same manner as Catalyst A of Example 1, including a final activation treatment in flowing air at 950° F. for 5 hours.

EXAMPLE 4

Catalysts A and C of Examples 1 and 3, respectively, are separately used to hydrocrack separate portions of a light cycle oil of the following description:

| | |
|---|---|
| Gravity, ° API | 19.5 |
| Aniline point, ° F. | 62 |
| Sulfur content, wt. percent | 0.43 |
| Nitrogen content, p.p.m. | 330 |

ASTM D-1160 distillation:

| | |
|---|---|
| ST/5 | 381/471 |
| 10/30 | 492/532 |
| 50 | 569 |
| 70/90 | 598/635 |
| 95/EP | 648/681 |

The hydrocracking is accomplished at the following conditions:

| | |
|---|---:|
| Hydrogen pressure, p.s.i.g. | 1100 |
| Per-pass conversion to products boiling below 400° F., vol. percent | 80 |
| Liquid hourly space velocity v./v./hr. | 0.9 |
| Starting temperature | As indicated below |

The hydrocracking is accomplished on a recycle basis, that is, with recycle to the hydrocracking zone from the effluent thereof materials boiling above 400° F.

The hydrocracking activities of the two catalysts, as measured by the operating temperature necessary to achieve the indicated per-pass conversion, and the fouling rates of the two catalysts, as indicated by the hourly rise in temperature necessary to maintain the indicated per-pass conversion, are:

| | Catalyst A | Catalyst C |
|---|---:|---:|
| Operating temperature, °F | 725 | 725 |
| Fouling rate, °F./hr | 0.07 | 0.03 |

From the foregoing, it may be seen that Catalyst A is as active as comparison Catalyst C, but that it has poor stability compared with Catalyst C.

EXAMPLE 5

Catalysts B and C of Examples 2 and 3, respectively, are separately used to hydrocrack separate portions of a gas oil of the following description:

| | |
|---|---:|
| Gravity, °API | 29.0 |
| Aniline point, 0° F. | 165 |
| Sulfur content, wt. percent | 1.9 |
| Nitrogen content, p.p.m. | 390 |

ASTM D-1160 distillation:
| | |
|---|---|
| ST/5 | 486/551 |
| 10/30 | 577/629 |
| 50 | 674 |
| 70/90 | 716/791 |
| 95/EP | 825/948 |

The hydrocracking is accomplished at the following conditions:

| | |
|---|---:|
| Hydrogen pressure, p.s.i.g. | 1300 |
| Per-pass conversion to products boiling below 550° F., vol. percent | 70 |
| Liquid hourly space velocity v./v./hr. | 1.5 |
| Starting temperature | As indicated below |

The hydrocracking is accomplished on a recycle basis, that is, with recycle to the hydrocracking zone from the effluent thereof materials boiling above 550° F. The hydrocracking activities of the two catalysts, as measured by the operating temperatures necessary to achieve the indicated per-pass conversion, and the fouling rates of the two catalysts as indicated by the hourly rise in temperature necessary to maintain the indicated per-pass conversion, are:

| | Catalyst B | Catalyst C |
|---|---:|---:|
| Operating temperature, °F | 705 | 706 |
| Fouling rate, °F./hr | 0.02 | 0.02 |

From the foregoing, it may be seen that Catalyst B has essentially the same activity and the same stability as comparison Catalyst C. Accordingly, the heat treatment activation of Catalyst A at 1275° F. for 2 hours results in a catalyst, Catalyst B, having a stability markedly better than that of Catalyst A, and this is achieved without harm to the activity of the catalyst.

CONCLUSIONS

Applicants do not intend to be bound by any theory for the unexpectedly superior activities and stabilities of the catalysts treated according to the process of the present invention. They assume that the favorable results are largely attributable to, and unique to, the particular combination of catalytic components used, in further combination with the particular method by which the thermactivation treatment is conducted.

Although only specific embodiments of the present invention have been described, numerous variations can be made in these embodiments without departing from the spirit of the invention, and all such variations that fall within the scope of the appended claims are intended to be embraced thereby.

What is claimed is:

1. The method of activating a catalyst composite comprising a matrix comprising a silica-alumina gel, a crystalline zeolitic molecular sieve component dispersed in said gel matrix in particulate form, and a hydrogenating component selected from rhenium and oxides and sulfides of rhenium, which method comprises heating said catalyst composite in an oxygen-containing gas stream at least as dry as ambient air at temperatures in the range 1200° to 1600° F. for 0.25 to 48 hours, whereby the stability of said catalyst composite is substantially improved compared with the stability thereof after activation at a lower temperature.

2. The method of activating a catalyst composite comprising:
   (A) A gel matrix comprising:
      (a) at least 15 weight percent silica,
      (b) alumina, in an amount providing an alumina-to-silica weight ratio of 15/85 to 80/20;
   (B) A cracking component comprising a crystalline zeolitic molecular sieve, said cracking component being in particulate form and being dispersed through said gel matrix;
   (C) A hydrogenating component selected from Group VIII metals, oxides and sulfides; and
   (D) A hydrogenating component selected from rhenium and oxides and sulfides of rhenium;

which method comprises heating said catalyst composite in an oxygen-containing gas stream at least as dry as ambient air at temperatures in the range 1200° to 1600° F. for 0.25 to 48 hours, whereby the stability of said catalyst composite is substantially improved compared with the stability thereof after activation at a lower temperature.

3. The method as in claim 2, wherein said catalyst composite further comprises a hydrogenating component selected from Group VI metals, oxides and sulfides.

4. The method as in claim 2, wherein said catalyst composite further comprises a component selected from Group IV metals, oxides and sulfides.

5. The method as in claim 2, wherein said crystalline zeolitic molecular sieve is substantially in the ammonia or hydrogen form, and is substantially free of any catalytic loading metal or metals.

References Cited

UNITED STATES PATENTS

| | | | |
|---|---|---|---|
| 3,140,253 | 7/1964 | Plank et al. | 208—120 |
| 3,236,762 | 2/1966 | Rabo et al. | 201—111 |
| 3,278,418 | 10/1966 | Wilson | 252—454 X |
| 3,407,148 | 10/1968 | Eastwood et al. | 252—455 |

DANIEL E. WYMAN, Primary Examiner

C. F. DEES, Assistant Examiner